(12) United States Patent
Bordini

(10) Patent No.: US 6,607,466 B2
(45) Date of Patent: Aug. 19, 2003

(54) DEVICE FOR CONTROLLING THE WORKING CONDITIONS OF A SELF-PROPELLED VEHICLE

(75) Inventor: Giorgio Bordini, Santa Cruz de Tenerife (ES)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/026,268

(22) Filed: Dec. 21, 2001

(65) Prior Publication Data

US 2003/0119625 A1 Jun. 26, 2003

(51) Int. Cl.$^7$ ............................................... B60K 1/02
(52) U.S. Cl. ........................... 477/3; 477/107; 475/5
(58) Field of Search ............................. 477/3, 5, 107, 477/108, 111, 36; 180/65.4, 65.8, 53.5, 53.1; 475/5; 74/15.63, 15.66, 335, 473.12

(56) References Cited

U.S. PATENT DOCUMENTS

| | | | | |
|---|---|---|---|---|
| 4,627,522 A | * | 12/1986 | Ulrich et al. ................. 192/35 |
| 5,056,379 A | * | 10/1991 | den Ouden ................. 477/109 |
| 5,560,249 A | * | 10/1996 | Nellums ....................... 74/339 |
| 5,611,751 A | * | 3/1997 | Ehrenhardt et al. ........... 477/73 |
| 5,730,676 A | * | 3/1998 | Schmidt ........................ 475/5 |
| 5,947,855 A | * | 9/1999 | Weiss ............................ 475/5 |
| 5,971,888 A | * | 10/1999 | Goode ........................ 477/107 |
| 5,993,351 A | * | 11/1999 | Deguchi et al. ................ 477/5 |
| 6,019,699 A | * | 2/2000 | Hoshiya et al. ............... 477/20 |
| 6,019,702 A | * | 2/2000 | Ehrenhardt et al. ........... 477/97 |
| 6,090,007 A | * | 7/2000 | Nakajima et al. ............. 477/46 |
| 6,092,013 A | * | 7/2000 | Stelzle et al. .................. 701/50 |
| 6,129,187 A | * | 10/2000 | Bellanger et al. ........... 192/3.58 |
| 6,135,914 A | * | 10/2000 | Yamaguchi et al. ........... 477/3 |
| 6,267,189 B1 | * | 7/2001 | Nielsen et al. ............. 180/53.1 |
| 6,286,987 B1 | * | 9/2001 | Goode et al. ................. 366/60 |
| 6,491,599 B1 | * | 12/2002 | Schmidt ........................ 475/5 |
| 6,551,208 B1 | * | 4/2003 | Holmes et al. ................. 475/5 |

* cited by examiner

Primary Examiner—Sherry Estremsky
Assistant Examiner—David D. Le
(74) Attorney, Agent, or Firm—John William Stader; Rebecca L. Henkel

(57) ABSTRACT

A device controls the operating conditions of a self-propelled vehicle. The device includes a first device for controlling the travelling speed of the self-propelled vehicle, and a second device for controlling the output speed of an internal combustion engine. The first and second devices are separate from each other.

5 Claims, 1 Drawing Sheet

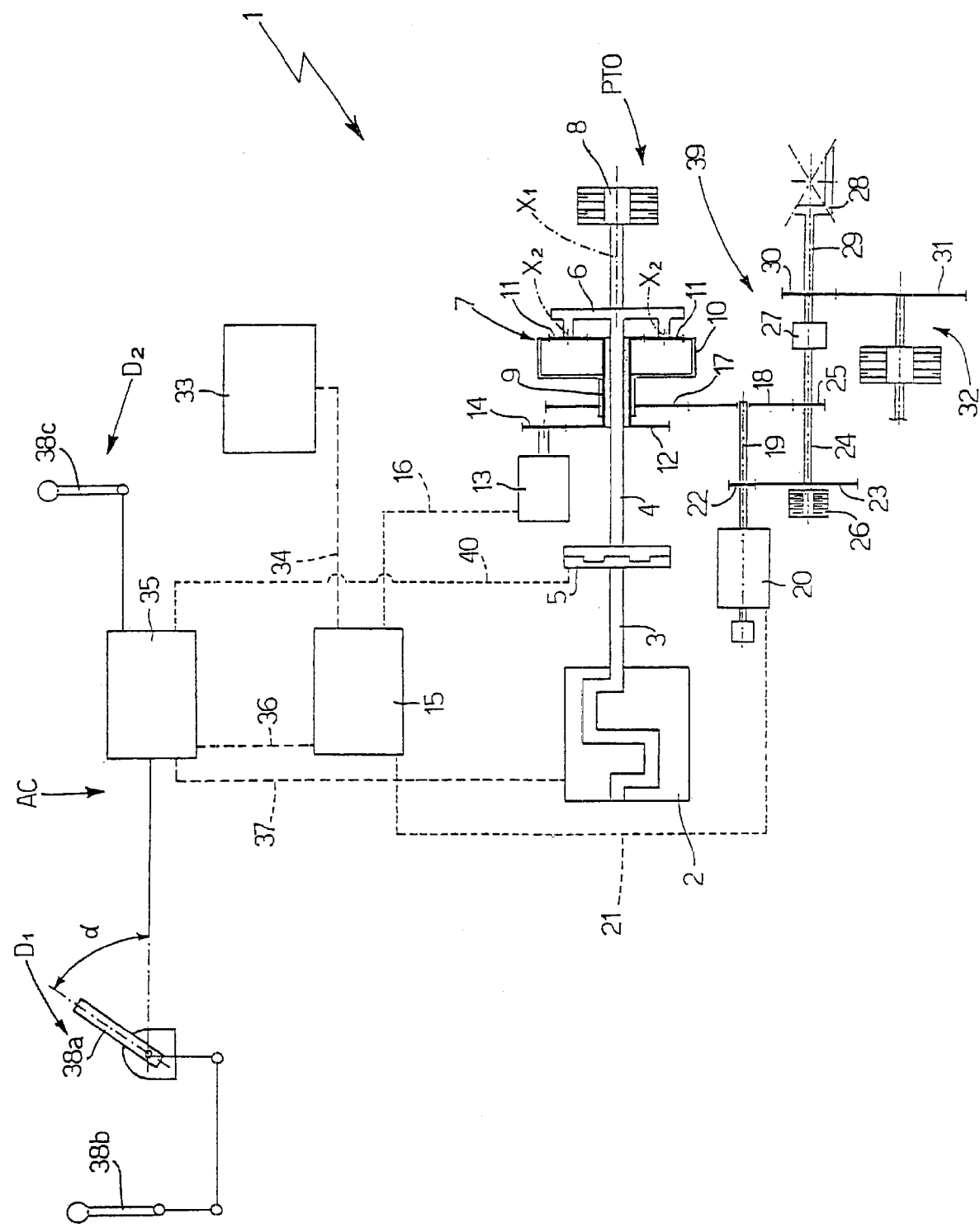

DEVICE FOR CONTROLLING THE WORKING CONDITIONS OF A SELF-PROPELLED VEHICLE

BACKGROUND OF THE INVENTION

The present invention relates to a device for controlling the working conditions of a self-propelled vehicle such as an agricultural tractor.

As is known, self-propelled vehicles, particularly hybrid types, are equipped with a single pedal-, lever- or pedal-and-lever-operated device for regulating the travelling speed of the vehicle according to the set gear ratio.

In the case of a diesel internal combustion engine, in particular, fuel injection can be governed to obtain the best conditions in terms of specific consumption, noise level, etc.

All this, however, fails to take into account connection of the PTO, the device by which the vehicle supplies power externally by means of a rotary shaft. When connecting the PTO, in fact, the operator must also select its rotation speed, which is normally set to 540, 750 or 1000 rpm, depending on the type and size of the implement attached to the PTO.

Consequently, since the PTO is connected mechanically to the output shaft of the internal combustion engine, a variation in the rotation speed of the drive shaft to adapt it to the best PTO conditions also results in a variation in the travelling speed of the vehicle, which is obviously undesirable.

By way of an inventive solution, it is therefore proposed to separate the speed of the vehicle from that of the drive shaft connected directly to the PTO, which of course calls for a power unit permitting internal gear ratio adjustment to separate the speed of the internal combustion engine from that of the vehicle, and so obtain both the required PTO and vehicle speeds.

In this case, the system continues to provide the required vehicle travelling speed, but at the expense of minimum consumption, low noise, etc.

SUMMARY OF THE INVENTION

It is an object of the present invention to provide a device for controlling the working conditions of a self-propelled vehicle, as defined in the accompanying Claims.

It is an advantage of this invention that the mechanical power is divided into two streams.

It is a feature of this invention that the first mechanical stream is converted into an electric stream which is manipulated according to the required working conditions of the power unit.

It is another feature of this invention that the electric power is converted back to mechanical and is combined with the second mechanical stream which has been conditioned for balance by, so as to mate with, the first stream.

It is another object of this invention to provide for direct control of the speed of engine when the PTO is connected, with precedence over electronic control of the speed of the vehicle.

It is another advantage of this invention that in an underpower situation the vehicle would have to travel at a lower speed than the device setting until a balance is reached between the total power transmitted and the power supplied by the engine.

These and other objects, features and advantages are accomplished according to the instant invention by providing a device controlling the operating conditions of a self-propelled vehicle. The device includes a first device for controlling the travelling speed of the self-propelled vehicle, and a second device for controlling the output speed of an internal combustion engine. The first and second devices are separate from each other.

BRIEF DESCRIPTION OF THE DRAWINGS

The advantages of this invention will become apparent upon consideration of the following detailed disclosure of the invention, especially when taken in conjunction with the accompanying drawing depicting a simplified overall diagram of the power unit of a self-propelled vehicle comprising the device according to the present invention.

DETAILED DESCRIPTION OF THE PREFERRED EMBODIMENT

The power unit 1 comprises an internal combustion engine 2, in particular a diesel engine, for supplying mechanical power to a first propeller shaft 3, which is connected mechanically to a second propeller shaft 4 by a torque-limiting device 5 for connecting/disconnecting shaft 3 mechanically to/from shaft 4. At the end away from device 5, second shaft 4 terminates in a planet carrier 6 of an epicyclic gear train 7, and supplies part of the power to a clutch 8 of a PTO (not shown).

In addition to planet carrier 6, an epicyclic gear train 7 also comprises a sun gear 9, a ring gear 10, and a number of planet gears 11. Planet carrier 6 is rotated by internal combustion engine 2 in conventional manner about an axis X1, while planet gears 11 are rotated about axes X2 as described in detail later on. The sun gear 9 is integral with a gear 12 for transmitting power to, or receiving power from, an electric machine 13 via a gear 14 meshing with gear 12. Depending on the operating conditions of power unit 1, electric machine 13 acts either as a generator or motor (see below). The electric machine 13 is connected electrically to a power converter 15 over an electric line 16.

The ring gear 10 of gear train 7 is integral with a gear 17 meshing with an idle gear 18 on a shaft 19 of an electric machine 20, which is also connected electrically to converter 15 over an electric line 21 and, depending on the operating conditions of unit 1, also acts as a generator or motor (see below). The shaft 19 is also fitted with a gear 22 meshing with a gear 23 fitted to a shaft 24 which supports a gear 25 meshing with idle gear 18. The shaft 24 is fitted at one end with a brake 26, and may conveniently, though not necessarily, be fitted at the other end with a dual-ratio transmission 27 for transmitting power to a differential 28 connected to the rear wheels of the vehicle. A shaft 29 extends between the transmission 27 and the differential 28, and is fitted with a gear 30 meshing with a gear 31 forming part of a device 32 for transmitting power to the front axle of the vehicle.

An electric-energy storage device 33 is connected electrically to converter 15 over an electric line 34. All the operations performed by unit 1 are controlled by an electronic central control unit 35 connected electrically to converter 15 and engine 2 over respective electric lines 36, 37. The output speed of unit 1 is selected by the operator by means of a control pedal 38a or lever 38b. In other words, vehicle speed is selected by the operator selecting a given tilt angle α of pedal 38a or lever 38b. Normally, when power is drawn solely from engine 2 and machine 13 acts as a motor, machine 20 acts as a generator, and vice versa. Which machine 13, 20 is to act as a motor and which as a generator is determined by central control unit 35 acting on converter 15. Only in an "overboosting" situation do both electric machines 13, 20 act as motors, or electric machine 13 acts as a motor and no power is drawn by electric machine 20.

The gear train 7 and gears 12, 14, 17, 18, 22, 23 25 define a device 39 for dividing/combining the power supplied by engine 2 and supplied/drawn by machines 13, 20. The mechanical power stream is first divided into two streams, one of which is converted from a mechanical to an electric power stream which can be manipulated easily by controlling torque factors and the rotation speed of the drive shaft. Obviously, for a given power, increasing torque automatically reduces the rotation speed of the drive shaft, and vice versa, so that the product of the two remains constant. Manipulating one power stream, however, automatically affects the other. The torques supplied in the mechanical and electric power streams are interrelated, in the sense that reducing the torque factor of one stream also changes the torque of the other. The sum of the two torques, however, in each case is the torque value to be transmitted to the wheels to move the vehicle.

In other words, if P1 is the power first converted to electric and then back to mechanical, and P2 the power that remains mechanical at all times, P1 plus P2 is the traction power transmitted. Consequently, manipulating power P1 is tantamount to also manipulating power P2, i.e. by regulating power P1 electrically, it is also possible to regulate unconverted mechanical power P2.

A detailed description of the operation of unit 1 can be found in my U.S. patent application Ser. No. 09/981,368, filed on Oct. 16, 2001, the contents of which is incorporated herein by reference to be considered an integral part of the present invention. In short, mechanical power is processed by unit 1 to divide the mechanical power into two streams. Then, the first mechanical stream is converted into an electric stream which is manipulated according to the required working conditions of the power unit. The electric power is converted back to mechanical and is combined with the second mechanical stream which, however, has been conditioned for balance by, so as to mate with, the first stream.

The object of the present invention is a control device AC for controlling the working conditions of unit 1, and which comprises two separate devices: a first device D1, in turn comprising pedal 38a and lever 38b, for only controlling the travelling speed of the vehicle powered by unit 1; and a second device D2, in turn comprising a control lever 38c, for setting the rotation speed of shaft 3, and hence the rotation speed of the PTO, by means of a command entered in and processed by central control unit 35.

The commands imparted by first device D1 via pedal 38a or lever 38b serve solely to control the travelling speed of the vehicle. Device D1 comprises an electric angle transducer (not shown) and directly controls the speed of electric machines 13, 20, which, together with the rotation speed of shaft 3, ensure the required travelling speed of the vehicle as described in detail in the aforementioned U.S. patent application Ser. No. 09/981,368. Device D1 is therefore calibrated in km/h.

As stated, a lever 38b, forming part of device D1, is electrically parallel with pedal 38a, and has a mechanical position memory so that the travelling speed of the vehicle, which is constant for each position of lever 38b, can be pre-set with no need for continual position control of pedal 38a, which is a spring-return type for added operator comfort. Of the two signals transmitted by pedal 38a and lever 38b, precedence is assigned by the electronic program processed by central control unit 35, which may, for example, privilege the higher of the two set values. One aspect of the present invention which should be stressed is that there is no direct relationship between the device D1 signal and the rotation speed of output shaft 3 of engine 2.

The second device D2 comprises a lever 38c, and provides for setting the rotation speed of shaft 3 and, therefore, of the PTO. As stated, the rotation speed of the PTO must be selected around standard reference values, such as 540, 750 and 1000 rpm, depending on the type and size of the implements to be powered by the vehicle, in particular a tractor, and so that the implements operate correctly. The primary object of the present invention is therefore to provide for direct control of the speed of engine 2 when the PTO is connected, with precedence over electronic control of the speed of the vehicle by device D1. For which purpose, the present invention proposes adopting a second command by means of lever 38c of device D2, which generates a proportional electric signal which is only enabled when the PTO is connected mechanically and therefore when clutch 8 of the PTO is activated. The second command acts on an actuator (not shown) controlling the injection pump of engine 2, so as to establish a direct relationship between the tilt of lever 38a and the speed of engine 2, and at the same time determines the rotation speed of the PTO.

When the PTO is connected, the device D2 therefore functions in the same way as a conventional mechanical accelerator control, and electronic control of the engine 2 injection pump actuator functions as a conventional regulator. That is, the electronic control adapts the injection pump setting to compensate the speed of engine 2 alongside variations in the resisting load of the PTO, so as to ensure the predetermined PTO speed (540, 750 or 100 rpm).

The travel of lever 38c of device D2 may be calibrated in PTO speed ranges, e.g. the three speed values indicated above. Since operation of the PTO normally results in an increase in the rotation speed of shaft 3, electric machines 13, 20 provide for redistributing the speeds to perform the device D1 command. The device D2 command, however, must obviously have precedence over that of device D1. Precedence of the second command by device D2 over that of device D1 could give rise to situations in which the power output of engine 2 is greater or less than the total power actually required by the vehicle wheels and PTO.

In an overpower situation, engine 2 would operate below maximum torque, thus increasing consumption and noise level, as on conventional vehicles; whereas, in an underpower situation, given the maximum speed limitation of engine 2, the vehicle would have to travel at a lower speed than the device D1 setting until a balance is reached between the total power transmitted (traction and PTO) and the power supplied by the engine 2 according to the device D2 command. It should be pointed out that, on current vehicles, on the other hand, engine speed would fall gradually until the engine eventually stops, unless the operator downshifts through one or more gears.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

For example, in an embodiment not shown, device D2 may be eliminated, and lever 38b may be selectively disabled from controlling vehicle speed, and enabled to control the speed of the diesel engine. For which purpose, lever 38b may be provided with a button (not shown) for cutting out vehicle speed control by lever 38b when the PTO clutch is engaged.

Though device AC, which is the main object of the present invention, is described with reference to the particular power unit embodiment shown in the accompanying drawing, the teachings of the present invention may also be applied to advantage to any hybrid unit, and therefore also to a series hybrid unit, wherein at least part of the mechanical power is converted to electric power. In other words, the teachings of the present invention may be applied to a power unit wherein at least part of the power is manipulated electrically and acts as a "store" to separate the travelling speed of the vehicle from the output speed of the internal combustion engine.

What is claimed is:

1. A self-propelled tractor having ground-engaging wheels, said tractor comprising:

power means including an internal combustion engine with a drive shaft and at least two electrical machines, each said engine and said electrical machines each having output power, said engine and said at least two electrical machines each being connected mechanically to a device operable to subdivide and to re-combine the output powers delivered by said engine and said electrical machines, said electrical machines being operable to deliver and to absorb output power, said power means drivingly connected to said wheels to supply motive power thereto to move said tractor at a selectively variable travel speed and provide rotational power from said drive shaft directly to a PTO shaft at selectively variable output speeds;

a first device for controlling said travel speed of said tractor, said first device comprising a foot-operated throttle and a hand-operated throttle;

a second hand-operated device for controlling said output speed of said drive shaft and thus said PTO shaft;

said first and second devices being separate one from the other such that there is no direct relationship there between;

said device for subdividing and re-combining the output powers comprises epi-cycloid gearing;

said power means also including a clutch for said PTO; and wherein operation of said clutch disables said first device to selectively end control over the travel speed by said first device and enables said second device to control said travel speed and said output rotational speed of said drive shaft, and thus said PTO, at the same time.

2. The tractor of claim 1, wherein said tractor has a drive train and said epi-cycloid gearing comprises:

a spider connected mechanically to said engine;

a solar unit connected mechanically to one of said electric machines; and a ring gear connected mechanically to said tractor drive train and to the other of said at least two electric machines.

3. The tractor of claim 2, wherein:

the operating conditions of said second device affect the operating conditions of said first device.

4. The tractor of claim 3, wherein:

a speed selection by said second device has precedence over said speed of travel.

5. The tractor of claim 4, wherein:

said engine is a diesel engine.

* * * * *